United States Patent
Bayya et al.

(10) Patent No.: US 7,285,509 B2
(45) Date of Patent: Oct. 23, 2007

(54) OPTICAL TRANSMISSION OF BGG GLASS MATERIAL

(75) Inventors: Shyam S. Bayya, Ashburn, VA (US); Jasbinder S. Sanghera, Ashburn, VA (US); Ishwar D. Aggarwal, Fairfax Station, VA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 305 days.

(21) Appl. No.: 10/758,750

(22) Filed: Jan. 15, 2004

(65) Prior Publication Data
US 2005/0159289 A1    Jul. 21, 2005

(51) Int. Cl.
*C03C 3/253*    (2006.01)
(52) U.S. Cl. ...................................................... 501/42
(58) Field of Classification Search ............ 501/41, 501/42, 43
See application file for complete search history.

(56) References Cited

U.S. PATENT DOCUMENTS

| | | | |
|---|---|---|---|
| 5,305,414 A | 4/1994 | Higby et al. | |
| 5,486,495 A | 1/1996 | Jewell et al. | |
| 5,786,287 A | 7/1998 | Bayya et al. | |
| 6,589,895 B2 * | 7/2003 | Dejneka et al. | ............... 501/42 |

OTHER PUBLICATIONS

Bayya et al., "BaO-Ga2O3-GeO2 glasses with enhanced properties," Journal of Non-Crystalline Solids, 212, 1997, 198-207.*

* cited by examiner

*Primary Examiner*—David M Brunsman
(74) *Attorney, Agent, or Firm*—John J. Karasek; Amy Reesing

(57) ABSTRACT

This invention pertains to a BGG glass material with excellent optical and mechanical properties and to a method for its preparation characterized by the use of a halogen component. The BGG glass material is essentially devoid of water, has excellent optical transmission in the visible and mid-infrared wavelength range, and can be easily molded in small and large sizes and complex shapes at a low cost.

25 Claims, 2 Drawing Sheets

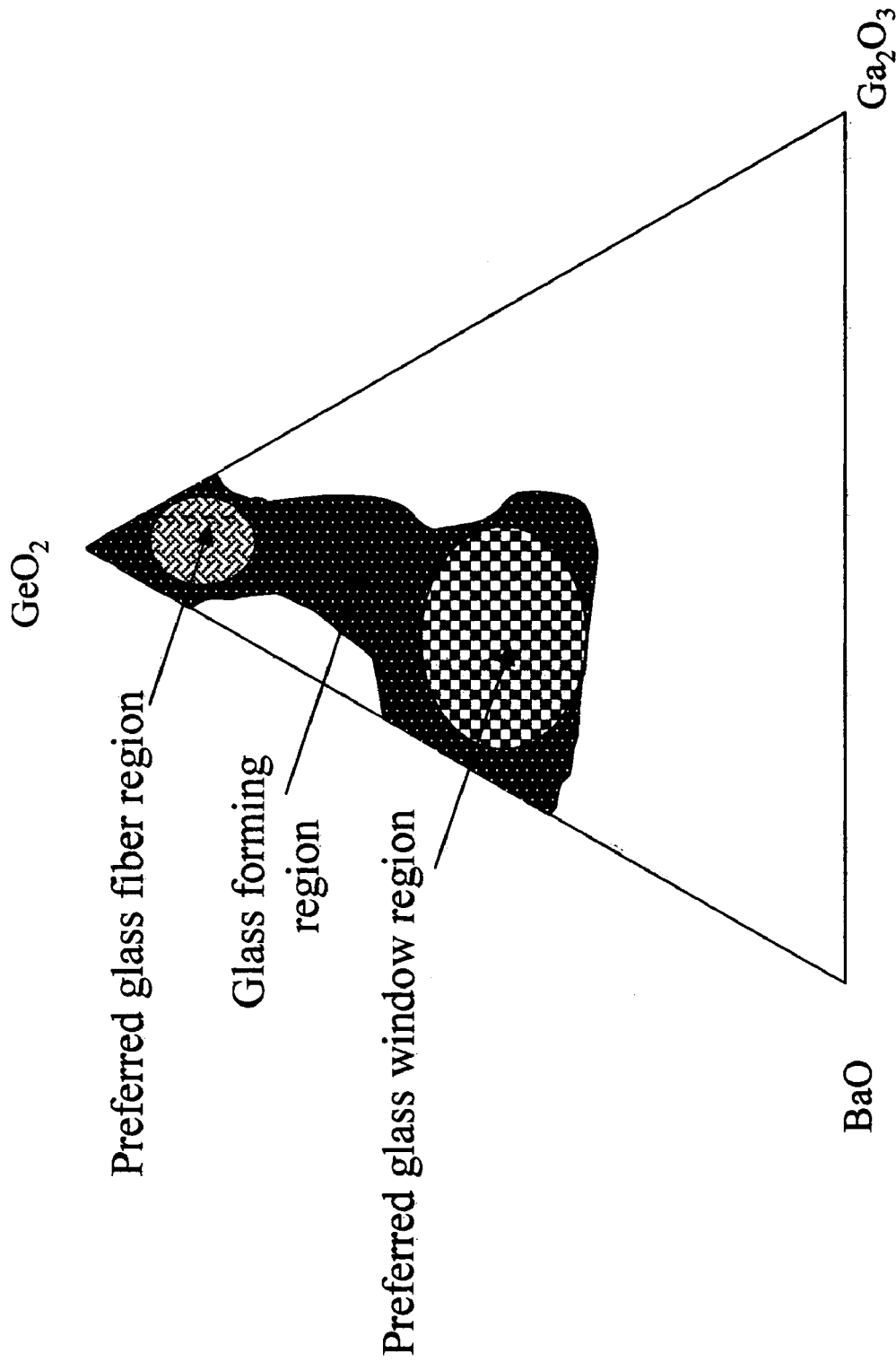

OPTICAL TRANSMISSION OF BGG GLASS MATERIAL

BACKGROUND OF THE INVENTION

1. Field of the Invention

This invention pertains to optical transmission in a barium-gallium-germanium oxide (BGG) glass material and to a method for making the BGG glass material.

2. Description of Related Art

There are numerous sensor and laser systems operating in the visible to infrared wavelength band of about 0.5 to 5 microns (μm). These systems require windows for protection. The size, shape and desired properties of the window depend on the application. These applications can be very military specific, such as sensor windows on aircraft, reconnaissance windows on military aircraft and un-attached vehicles, and missile domes, to very large windows for high energy laser systems. On the other hand, the applications can be very commercial, such as small inexpensive lenses for infrared optics and windows for all visible and mid-wave lasers. Materials choice for any application is strongly dependent on the required properties, desired size and shape and material availability. For example, applications such as high energy laser systems, require large windows in 20" to 75" diameter sizes with very low absorption coefficient, and a negative or very low positive dn/dT value that can minimize the optical path distortion. For some sensor applications, hemispherical or hyper hemispherical dome-shaped window may be required which are difficult and expensive to shape using currently used window materials. For some reconnaissance applications, some systems require large, i.e., larger than 13" diameter windows which currently limits the choice of the material to Cleartran which is a zinc sulfide (ZnS) material obtained by CVD followed by hot isostatic pressing. For lenses and other infrared optics, the material of choice is currently Cleartran since there is no low-cost alternate material.

Present commercially available window materials for the visible-infrared wavelength region are either too soft or have limited transmission and all are too expensive. Sapphire has excellent mechanical properties and can withstand the adverse environmental conditions but its transmission at 5.0 μm is limited by multi-phonon absorption. Sapphire windows are also very expensive and are difficult to polish in complex shapes. The cost of polishing sapphire is about five times higher than polishing glass. In addition, sapphire windows are only available in sizes of about 10" in diameter coming from a 13" diameter boule. Attempts to fabricate larger size sapphire have been unsuccessful due to crystal growth problems since sapphire is a single-crystal material and its growth is not only slow but it is also problematic. For some systems requiring larger size windows, Cleartran material has been the material of choice by default. Cleartran material has good transmission in the mid-infrared wavelength region but suffers from scattering in the visible region due to the presence of grain boundaries. Cleartran material is also too soft which results in poor rain and sand erosion resistance of the windows and additionally raises the cost of polishing. The polishing cost for Cleartran is almost four times higher than polishing glass. Cleartran also has a high dn/dT which results in defocusing or loss of power due to large optical path distortion for high energy laser applications. Cleartran material (ZnS) also has a high nonlinear coefficient which causes the window to emit visible green light during transmission of high intensity (1.06 μm) laser light through the material. Infrared lenses and windows for laser cavities for commercial applications are expensive due to the cost of re-finishing the surfaces.

The material disclosed in the earlier U.S. Pat. No. 5,305,414 on BGG glass exhibited limited glass stability and infrared transparency due to water impurity (OH⁻), see FIG. 1. This poor stability led to crystallization when attempts were made to make windows large enough for practical applications, i.e., larger than 4 inches in diameter. Crystallization gave high optical scatter while the OH absorption bands considerably reduced the optical transmission in the mid-infrared range due to extrinsic absorption. The OH⁻ concentration in the prior art BGG glass was greater than 10 ppm. Consequently, the glass as disclosed previously, could not and was not used for practical applications, despite its great potential.

OBJECTS AND BRIEF SUMMARY OF THE INVENTION

An object of this invention is to provide BGG glass material which has long infrared cut-off wavelength and improved optical transmission relative to silicate glass and glass ceramic.

Another object of this invention is cheaper BGG glass material that is nearly devoid of the —OH absorption band corresponding to less than about 1 ppm with excellent optical transmission in the visible to mid-infrared wavelength region.

Another object is a BGG glass material that is stable, can be scaled-up in size and can be easily molded in any size and shape to provide high optical quality and visible-infrared optics at significantly lower cost than the currently used material.

Another object of this invention is a BGG material for infrared window and dome applications with significantly better physical properties compared to previously used materials for these applications.

Another object of this invention is a BGG glass material with a better infrared transmission compared to sapphire or hot pressed zinc sulfide, i.e., Cleartran material.

Another object of this invention is a BGG glass material where its fabrication cost is only about a quarter that of hot pressed zinc sulfide.

Another object of this invention is a method for making BGG glass material.

These and other objects can be attained by making a BGG glass material from barium carbonate or barium oxide, gallium oxide, germanium oxide, a halogen component, and optionally, at least one other component, wherein the BGG glass material is characterized by a low OH⁻ absorption in the wavelength region of about 2-6 μm.

BRIEF DESCRIPTION OF THE DRAWINGS

FIG. 2 is a phase diagram of a BGG glass, showing BGG glass forming region, windows-type application region within the BGG glass forming region, and the BGG glass fiber forming region.

DETAILED DESCRIPTION OF THE INVENTION

Figure 1:
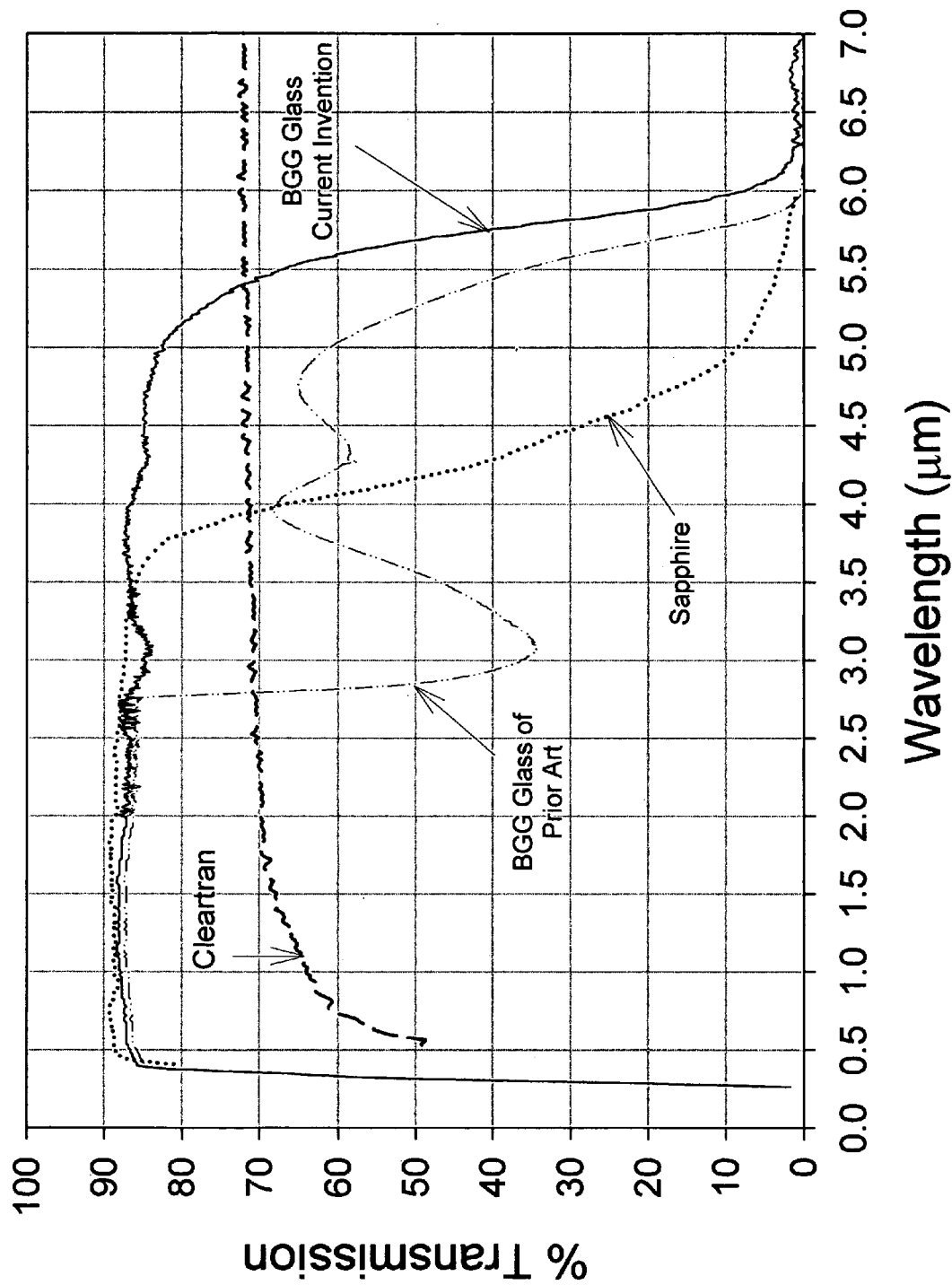
FIG. 1 is a plot of % IR Transmission versus Wavelength (μm) for BGG glass devoid of a halogen component, BGG glass with a halogen component, hot pressed zinc sulfide (ZnS), i.e., Cleartran material, and sapphire.

The invention disclosed herein pertains to a method of making a BGG glass material and to BGG glass material devoid of water which has excellent transmission in the 0.5-6 µm wavelength region for visible and infrared applications. The BGG glass material includes BGG glass, BGG glass-ceramic and BGG composite material. The BGG glass material has excellent optical and mechanical properties for various applications in the 0.5-6 µm wavelength region, including military and commercial infrared lenses and optics as well as windows. The BGG glass material can be easily molded in both small and large sizes and complex shapes at a fractional cost compared to the currently used state-of-the-art visible infrared crystalline materials.

FIG. 1 clearly shows the effect of removing water from a BGG glass by addition of a halogen component. FIG. 1 is a comparison plot for a number of substances in terms of transmission versus wavelength for prior art BGG glass, BGG glass of this invention, the competing Cleartran (ZnS) material, and sapphire. The prior art BGG glass had composition, in mole %, of 42.9 barium oxide, 17.0 gallium oxide, and 40.1 germanium oxide whereas the BGG glass of this invention had composition, in mole %, of 37.9 barium oxide, 5.0 barium chloride, 17.0 gallium oxide, and 40.1 germanium oxide. Items of interest pertaining to FIG. 1 include the drop in transmission due to the water impurity over the range of up to about 6 µm wavelength for the prior art BGG glass; the essential elimination of its deleterious effect on transmission over essentially the same range; the lower transmission of the Cleartran material and its drop-off in the wavelength region below about 1.5 µm; and the drop-off of transmission for sapphire beyond about 4.2 µm. Thickness of the prior art BGG glass sample, the BGG glass sample of this invention, the Cleartran sample and of the sapphire sample, was 5 mm.

The invention herein is characterized by addition to BGG glass components of a small amount of a halogen component, such as a halogen gas or a halogen compound, which scavenges water and thereby produces volatile halides which escape into the atmosphere. Specific examples of halogen component include barium chloride ($BaCl_2$), barium fluoride ($BaF_2$), germanium chloride ($GeCl_4$), chlorine gas ($Cl_2$), thionyl chloride ($SOCl_2$), rubidium chloride (RbCl) and cesium chloride (CsCl). Addition of a solid halogen component is preferred for practical reasons based on more facile handling of a solid compound rather than a gas or a liquid. Addition of a halogen component to a silicate glass, for instance, is well known, however, addition of a halogen component to BGG glass components is unobvious and it produces unexpected results since it was thought that addition of a halogen component to a germanium-containing material, such as BGG glass, would result in formation of a volatile germanium tetrachloride ($GeCl_4$) which would escape into the atmosphere and thus change the composition of the glass by depletion of germanium. Compositional change through volatilization is undesirable and is detrimental to glass quality since it depletes the composition of germanium, which is a glass network former or a building block of glass. Loss of a key component such as germanium, results in destabilization of BGG glass. Addition of a halogen component, such as barium chloride ($BaCl_2$), as a component of a BGG glass, unexpectedly resulted in reduction in barium not germanium and loss of barium was not important in this system since the amount of barium stayed in the range characteristic of the BGG composition. Also, barium is not a network former so it does not play the same role as a network former.

The BGG material of the present invention is made from components that contain barium, gallium, germanium, a halogen component and can contain one or more other components. The barium, gallium and germanium can be derived from precursors which produce their respective oxides either directly or indirectly. Barium is typically in the form of barium oxide or barium carbonate powder, gallium is typically in the form of gallium oxide ($Ga_2O_3$) powder, germanium is typically in the form of germanium oxide ($GeO_2$) powder. These components can also be in the form of oxalates, as an example. The halogen component is typically barium chloride ($BaCl_2$) powder, although any other halogen component can be used considering its state and its affect on quality of the BGG glass material. For instance, germanium chloride ($GeCl_4$) is a liquid at room temperature and should not be used unless amends are made for its state. The anion of the halogen component can be chlorine, fluorine, bromine or iodine, although chlorides and fluorides are typically used, especially chlorides. If barium chloride ($BaCl_2$) is used, barium remains in the composition but some of the chloride combines with water impurity to form HCl or another chloride which evaporates or volatilizes.

Barium has atomic number of 56 in the Periodic Table of the Elements. If the cation of the halogen component is larger than barium, i.e., has a higher atomic number, then transmission edge of such a glass composition can be increased, but if the cation is smaller, then transmission edge of such a glass composition can be reduced. However, if barium chloride is used as the halide component, then there is no significant change in the transmission edge. If sodium chloride is used as the halogen component, since sodium atom, with its atomic number of 11, is substantially smaller than barium, a glass composition containing sodium chloride would have a substantially reduced transmission edge. The halide component can also be rubidium chloride (RbCl) or cesium chloride (CsCl). Since rubidium atom has atomic number of 37 and is thus smaller than the barium atom, the use of rubidium chloride in the composition would reduce the transmission edge or multiphonon edge. Cesium has an atomic number of 55, which is close to barium, and so does not have much affect on the multiphonon edge.

If the halogen component is a rubidium halide, such as rubidium chloride, then another advantage is realized, i.e., conventional ion exchange. A solid BGG glass composition containing rubidium can be ion exchanged by placing it for several hours into a molten compound having a cation larger than rubidium, such as cesium. An example of a suitable ion exchange compound is cesium chloride since its melting point is 690° C., a temperature at which the BGG glass material is solid. Another suitable ion exchange compound is cesium nitrate ($CsNO_3$) which has a melting point of 414° C. So, a solid BGG glass material containing rubidium placed into a molten cesium chloride for 6-12 hours will undergo ion exchange whereby rubidium ions will be exchanged by cesium ions to a depth of up to about 100 microns in the solid BGG material. In ion exchange, a larger ion is made to replace a smaller ion at a rate depending on concentration gradient between the two ions, which in this case are rubidium ions and cesium ions. Ion exchange is typically conducted between monovalent ions which results in placing the solid under compression due to exchange of smaller ions by larger ions. Ion exchange described herein can increase fracture strength of the material 3-4 times. A strengthened glass obtained by ion exchange is harder and has improved resistance to rain and sand erosion. High resistance to rain and sand erosion is required for applications where the material is exposed to harsh environmental conditions.

For window applications requiring very low laser optical path distortion, the glass composition can be modified to reduce dn/dT to zero or even to a negative value. This can be accomplished by partial or complete substitution of barium oxide and/or barium carbonate with rubidium oxide or cesium oxide, or their halides, in the BGG glass.

Addition of rubidium or cesium oxides, and/or their halides, can affect refractive index and coefficient of thermal expansion of a BGG glass material. For example, with addition of cesium oxide, refractive index will be on the order of 1.67 and with addition of rubidium oxide, refractive index will be on the order of 1.65, whereas the index is 1.72 without cesium oxide or rubidium oxide at a wavelength of 1.06 µm. Coefficient of thermal expansion will typically rise when monovalent ions replace divalent ions. With rubidium oxide substitution, coefficient of thermal expansion of BGG glass is on the order of 10 ppm/K and with cesium oxide, it is on the order of 11 ppm/K, whereas without either, the coefficient of thermal expansion of BGG glass is 9 ppm/K. Ion exchange has a negligible affect on bulk refractive index and expansion coefficient since ion exchange is a surface phenomena.

BGG glass components, which are formed into BGG glass composition, are given in Table 1, below, in mole percent. Cesium oxide and rubidium oxide are included in Table 1 for the reason that they can replace barium oxide and/or barium carbonate and it is desirable to have cesium and/or rubidium atoms in the final glass composition adapted for use where low dn/dT and low optical path distortion, are of interest.

TABLE 1

| glass components | preferred range | especially preferred range |
| --- | --- | --- |
| barium oxide (BaO) and/or barium carbonate | 0.1-50 | 20-45 |
| germanium oxide ($GeO_2$) | 35-90 | 40-60 |
| gallium oxide ($Ga_2O_3$) | 0.1-25 | 10-18 |
| cesium oxide ($Cs_2O$) | 0-50 | 0-40 |
| rubidium oxide ($Rb_2O$) | 0-50 | 0-40 |
| halogen component | 0.1-20 | 1-10 |

The BGG glass forming region is given and identified in FIG. 2 and defines the broad range of the BGG glass composition. The broad range of the BGG glass composition of the window-type application region, which is within the BGG glass forming region, is also identified as such in FIG. 2. The BGG fiber region is within the BGG glass forming region in FIG. 2 and is also identified as such. The BGG glass fiber region is at about the apex of the triangular phase diagram of FIG. 2 and the window application region is below the glass fiber region, with the phase diagram of FIG. 2 defined with 100 mole percent of germanium oxide ($GeO_2$) at the apex, with 100 mole percent of barium oxide (BaO) at the bottom left corner, and with 100 mole percent of gallium oxide ($Ga_2O_3$) at the bottom right corner of the phase diagram.

In the above Table 1, barium oxide can be replaced in part or in total by barium carbonate ($BaCO_3$) which is also typically in powder form. Other materials can be used in place of cesium oxide and/or rubidium oxide or use of these materials can be totally avoided. Rubidium oxide or cesium oxide or any other alkali oxide substitution for barium oxide and/or barium carbonate in the BGG glass can reduce the refractive index and increase the thermal expansion coefficient and thereby reduce the dn/dT and optical path distortion. Large amounts of the halide component should be avoided. Use of amounts in excess of about 30-40 mole percent in the BGG glass composition may result in an oxyhalide glass which is not durable and would be prone to crystallization, thus jeopardizing fabrication of large glass objects. Cesium oxide and/or rubidium oxide can be used to replace barium oxide partly or in total and if this is done, then the phase diagram for a glass composition containing cesium oxide and/or rubidium oxide will have cesium oxide and/or rubidium oxide at the left corner of the phase diagram where barium oxide was and the glass forming region would not change significantly. The narrow range in Table 1 is more application specific for window-type applications.

The rain and sand erosion resistance of the BGG glass and glass-ceramics can also be increased by making a hybrid or a composite with a harder material. Thin layers of hard materials, such as alumina ($Al_2O_3$), magnesium fluoride ($MgF_2$), yttria ($Y_2O_3$) and magnesia (MgO), can be coated or bonded on the BGG glass and/or glass-ceramic materials. The thickness of the hard coating can range from 1-100 µm. The bulk of the composite is still made of the BGG glass or BGG glass-ceramic having excellent transmission in the visible and mid IR wavelength region. However, having a surface coating made of a hard material results in a higher hardness, higher strength, higher rain erosion resistance and excellent chemical durability. The refractive index of the BGG glass is 1.70-1.75 at 632.8 nm, depending upon composition, and can be tailored to be the same or close to the refractive index of alumina, whose index is 1.70. A buffer layer for index matching is not necessary between BGG glass or BGG glass-ceramic and alumina but it may be required when the hard coating is of another composition with a large index difference. If desired, a buffer layer can be used between the BGG glass or BGG glass-ceramic and the coating. A final anti-reflection coating can be used on the top surface to minimize reflection losses. The hard layer on the BGG glass or glass-ceramic can be applied by direct bonding between the glass or glass-ceramic and the hard substrate. Hard coatings can also be applied by various film deposition techniques such as ion-assist e-beam evaporation and RF magnetron sputtering. The coating step will not significantly add to the cost of the BGG material and the cost of the overall composite material will still be significantly lower than the cost of currently used window materials. For the applications where only one side of the window is exposed to atmosphere and the other side is sealed, may have hard coating only on one side, reducing cost further. However, in applications where the windows are periodically removed and replaced, the hard coatings should be applied to both sides of the window.

The BGG glass material is prepared in a conventional manner. The BGG glass of sizes on the orded of 300-gram sample, can be prepared by heating and melting the glass components at about 1300° C. for about six hours above liquidus temperature ($T_l$) of about 1150° C., which is above the glass transition temperature ($T_g$) of about 675° C., then quickly cooling to prevent crystallization in about one-half hour to below $T_g$, when it solidifies. During the melting period, the melted glass composition can be fined to remove bubbles by removing mixing implements and the bubbling tube and allowing the molten glass composition to remain quiescent for about a few hours during which time, bubbles in the glass composition are allowed to escape. The solid glass is then heated to a temperature slightly above the $T_g$ of about 675° C. but below crystallization temperature of 875° C. and held at that temperature for about two hours or longer where annealing takes place to relieve stresses caused primarily by the rapid cool down to below the $T_g$. After annealing, the glass is slowly cooled at about 1° C. per minute to room temperature. The molten glass composition is, of course, solidified below the glass transition temperature. Instead of rapidly cooling the molten glass from about 1300° C. to room temperature, it can be rapidly cooled to the annealing temperature of about 700° C. and annealed and thereafter slowly cooled, as in the previous embodiment. Obviously, larger glass melts would require longer processing times.

Glass composition devoid of a halide component analyzed by glow discharge spectroscopy typically contains several hundred ppm chloride ion ($Cl^-$) and after addition of a halogen component, amount of the chloride ion ($Cl^-$) increases. For instance, a glass composition of 42.9 mole % of barium oxide, 17.0 mole % of gallium oxide and 40.1 mole % germanium oxide, contained 500 ppm (0.05 mole %) of chloride ion ($Cl^-$) whereas glass composition of this invention of 37.9 mole % barium oxide, 5.0 mole % barium chloride, 17.0 mole % gallium oxide and 40.1 mole % germanium oxide contained about 20,000 ppm (2%) of chloride ion ($Cl^-$), which means that about 3 mole % of chloride ion ($Cl^-$) was used to scavenge water by reacting chloride ($Cl^-$) with hydrogen ($H^+$) of the water to form volatile HCl, which escaped into the atmosphere.

Table 2 gives comparison of physical properties of a number of materials of interest with respect to the BGG glass of this invention which was composed of 37.9 mole % barium oxide (BaO), 5.0 mole % barium chloride ($BaCl_2$), 17.0 mole % gallium oxide ($Ga_2O_3$) and 40.1 mole % germanium oxide ($GeO_2$):

TABLE 2

| Parameters | Cleartran Material | Zinc Selenide | BGG Glass |
|---|---|---|---|
| Composition | ZnS | ZnSe | BaO, $GeO_2$, $Ga_2O_3$ |
| Structure | cubic crystal | cubic crystal | isotropic, glass |
| Grain Size (μm) | ~35 | ~50 | none |
| Density (g/cc) | 4.1 | 5.27 | 4.85 |
| Hardness (kg/mm$^3$) | 160 | 110 | 450 |
| Modulus of Elasticity (psi) | $10.7 \times 10^6$ | $9.75 \times 10^6$ | $10.1 \times 10^6$ |
| Poisson's Ratio | 0.3 | 0.28 | 0.3 |
| Flexure Strength (psi) | 10,000 | 8,000 | 12,500 |
| Refractive Index at 1 μm | 2.2 | 2.57 | 1.75 |
| dn/dT (at 632 nm)(K$^{-1}$) | $55 \times 10^{-6}$ | $100 \times 10^{-6}$ | $9 \times 10^{-6}$ |

The above Table 2 shows that Cleartran (ZnS) material is crystalline, as is zinc selenide (ZnSe) but not the BGG glass of this invention, which is amorphous. Other parameters of interest for window-like applications include hardness of 450 kg/mm$^3$ compared to hardness of only about ⅓ at 160 kg/mm$^2$ for the competing Cleartran material. The value of dn/dT is almost six times lower at $9 \times 10^{-6}$ K$^{-1}$ at 632 nm for BGG glass compared with the competing Cleartran material. The quantity of dn/dT is of critical concern in certain applications where optical path distortion is paramount and should be as close as possible to zero or should be a negative value. Poisson's ratio is a measure of material flexibility and at 0.3, the material is rigid.

Since glass-ceramic is typically 2-3 times stronger and may have other advantages, it may be desired to prepare BGG glass-ceramic rather than BGG glass. The BGG glass-ceramic material can be conventionally prepared either from the glass components or from a BGG glass cullet. If the BGG glass-ceramic is prepared from BGG glass components, then the glass components, including seed nucleating agent, are mixed and melted at about 1300° C. for several hours. During this time, the melted glass composition can be fined to remove bubbles by removing mixing implements and the bubbling tube and allowing the molten glass composition to remain quiescent for about one hour during which time, bubbles in the glass composition are allowed to escape. Then the molten glass composition is quickly cooled to room temperature and then reheated to above $T_g$ to about 700° C. for annealing. The annealing temperature should be above $T_g$ but below crystallization temperature ($T_c$), which for BGG glass is about 800° C. Glass transition temperature for BGG glass is about 675° C. Instead of cooling to about room temperature, cooling can be done directly to the nucleation temperature, if circumstances permit it. After nucleation, which should be for about one hour or longer, temperature is raised 100-200° C. to below $T_c$ and held there for about one hour to allow for crystal growth. During nucleation, crystals grow to typically below 1 nm and during crystal growth phase, growth should be to about 50 nm. Crystals above about 50 nm in size, scatter light. After the growth phase, the glass composition is cooled at about 5° C. per minute down to $T_g$, held there for about one hour for equilibration between outside and inside the glass and finally cooled at about 1° C. per minute to room temperature.

Preparation of the BGG glass-ceramic from a cullet is similar to preparation of the BGG glass-ceramic from the glass components with the exception of heating the BGG glass cullet from about room temperature where the glass is solid, to the nucleation and growth temperature, where glass is a viscous solid capable of crystallization.

When preparing the glass-ceramic, nucleating agent (seed material) is added in most cases to the BGG glass components although certain compositions may exhibit phase separation which acts to promote seed precipitation for nucleation. Examples of suitable seed material, which are soluble in the glass melt, are titanium dioxide ($TiO_2$) powder, zirconium dioxide ($ZrO_2$) powder and the like. Amount of the seed material is the amount that can be added to its saturation point in the glass melt which, for zirconia is about 1 mole % and for titania is about 1 mole %, determined by trial and error. The saturation limit is typically determined at the melting temperature of about 1300° C. and since the seed material is typically less soluble at lower temperatures and precipitates out as temperature is reduced, this phenomena is exploited during nucleation and growth stages of glass-ceramic preparation. Addition of a large amount of a seed material beyond the saturation limit of a glass melt, will destabilize BGG glass and should be avoided.

Having described the invention, the following examples are given as particular embodiments thereof and demonstrate the practice and advantages thereof. It is understood that the examples are given by way of illustration and are not intended to limit the specification or the claims in any manner.

EXAMPLE 1

This example details the use of 5 mole percent of barium chloride powder as the halogen component in making a BGG glass of this invention.

A 125-gram BGG glass component batch of 42.9 mole % barium oxide (BaO), 17 mole % gallium oxide ($Ga_2O_3$), and 40.1 mole % germanium oxide ($GeO_2$) was prepared by mixing 58.8 grams of barium carbonate ($BaCO_3$), 8.18 grams of barium chloride ($BaCl_2$), 25.05 grams of gallium oxide ($Ga_2O_3$) and 32.97 grams of germanium oxide ($GeO_2$). The glass batch was mixed in a mixer for 30 minutes and was then transferred to a platinum crucible. The platinum crucible containing the batch material was placed in a pre-melting furnace preheated to 1350° C. The batch material was left in the furnace to melt and allow evolution and removal of $CO_2$ gas for 10 minutes and then quenched in air to make a cullet. The cullet was then transferred to another crucible that was loaded in a sealed atmosphere controlled furnace. The furnace was flushed with dry argon for one hour to remove moist air. The furnace was then heated to 1300° C. under $Ar/O_2$ atmosphere. The glass was bubbled with $Ar/O_2$ 80:20 mixture for 9 hours. After 9 hours of bubbling, the bubbling tube was pulled out of the melt with the $Ar/O_2$ gases still flowing over the melt. The melt was left at 1300° C. for another 2 hours to fine (removal of bubbles) and was then quenched in the sealed furnace and allowed to cool to about room temperature. The cooled glass was then taken out of the crucible and annealed. Annealing was performed by placing the sample in an annealing oven to heat to 700° C. for 2 hours and was slowly cooled to room temperature at 1° C./min. After annealing, the sample was cut in about 5 mm thick test pieces and polished for IR transmission measurements. FIG. 1 shows the IR transmission of the dried BGG glass in the 0.4-6 μm wavelength region and compares it with the BGG glass of U.S. Pat. No. 5,305,414. The curve has not been corrected for the reflection losses. On a plot of Absorbance ($cm^{-1}$) and Wavelength (μm), moisture of the prior art BGG glass is at best about 20 ppm at about 3 μm whereas it is less than 1 ppm for the glass of this invention.

EXAMPLE 2

This example details the fabrication of a composite with alumina ($Al_2O_3$) on both surfaces of a bulk BGG glass substrate.

A glass melt was prepared in a process similar to the one described in Ex. 1, above. The BGG glass was polished to an optical finish. Polished BGG glass measuring 1"×1"×½" was then coated with 5 μm thick alumina on both sides using ion-assist e-beam evaporation. The coated substrate was tested for environmental durability as per MIL-F-48616 test and rain erosion resistance at 90° and 45° impact angles of 2 mm water drops hitting the substrates at various speeds. The results of the environmental and the rain erosion resistance tests are shown in Tables 3 and 4. All the samples passed all the tests.

TABLE 3

The following tests were performed on alumina coated BGG glass samples in sequence:

1. Adhesion
2. Humidity, at 24 hours at 120° F. and 95-100% RH
3. Moderate Abrasion, 50 strokes at 1 pound of force
4. Severe Abrasion, 20 strokes at 2-2.5 pounds of force
5. Temperature, 2 hours each at −80° F. and at +160° F.
6. Solubility, 10 minutes each in acetone and ethyl alcohol
7. Salt Solubility, 24 hours immersion in salt solution
8. Water Solubility, 24 hours immersion in distilled water
9. Salt Fog, for 24 hours All samples passed all tests.

TABLE 4

| Sample ID | Substrate | $Al_2O_3$ Coating Thickness | Speed (mph) | Impact Angle | Time (min) | Result | Analysis |
|---|---|---|---|---|---|---|---|
| R5M2 | BGG glass | 5 μm | 300 | 45° | 20 | passed | no apparent damage |
| R10M2 | BGG glass | 10 μm | 300 | 45° | 20 | passed | no apparent damage |
| R5M3 | BGG glass | 5 μm | 300 | 90° | 20 | passed | no apparent damage |
| R10M3 | BGG glass | 10 μm | 300 | 90° | 20 | passed | no apparent damage |
| R20M3 | BGG glass | 20 μm | 300 | 90° | 20 | passed | no apparent damage |

In the above Table 4, in sample ID R5M2, the letter R denotes rain erosion test, the numeral 5 indicates thickness of the alumina coating, the letter M stands for microns and the numeral 2 designates number of samples. It should be noted that thickness of the alumina coating varied from 5 to 20 microns, depending upon the conditions used during its deposition.

EXAMPLE 3

This example details the fabrication of a composite with sapphire on both surfaces of a bulk BGG glass substrate.

A BGG glass melt was prepared in a process similar to the one described in Ex. 1. A 1-millimeter thick single crystal disk 1" in diameter was placed in the mold first and the glass was poured on it. A second sapphire single crystal disk was immediately placed on the glass melt while the melt was still fluid and was gently pressed to push the sapphire crystal slightly below the surface to the desired height. The final product was a self-standing monolithic window with the surface hardness and strength of sapphire and the optical properties of BGG window.

The advantages of this invention are the following:

1. A new glass devoid of the —OH absorption band with excellent transmission in the visible to mid-IR wavelength region.

2. A glass that is stable and can be scaled up in size and is easily moldable in any size and complex shape to provide high optical quality vis-IR optics, such as lenses and the like, at significantly lower cost.

3. A new composite material for IR window and dome applications with significantly better physical properties compared to the previously reported glasses for these applications.

4. A composite material having better IR transmission compared to sapphire.

5. A material which has better visible transmission compared to Cleartran material.

6. A material which has better mechanical properties compared to ZnS (Cleartran) and ZnSe.

7. The fabrication cost of this new composite material, and the BGG material of this invention, is estimated to be only about 25% of the fabrication of other competing crystalline materials.

While presently preferred embodiments have been shown of the novel BGG optical material and fabrication thereof, persons skilled in this art will readily appreciate that various additional changes and modifications can be made without departing from the spirit of the invention as defined and differentiated by the claims that follow.

What is claimed:

1. A process for preparing a BGG glass material comprising the steps of
    melting BGG glass components at a melting temperature, said components consisting essentially of barium oxide (BaO) and/or barium carbonate ($BaCO_3$), gallium oxide ($Ga_2O_3$), germanium oxide ($GeO_2$), or a precursor thereof, and a halogen component at a temperature above liquidus temperature of the BGG glass to form a BGG glass melt, wherein amounts of the BGG glass components are in the BGG glass forming region;
    bubbling said BGG glass components with a dry gas during said melting step;
    quickly cooling the BGG glass melt to avoid crystallization to below glass transition temperature of the BGG glass to form a BGG glass;
    annealing the BGG glass at a temperature above the glass transition temperature but below crystallization temperature; and
    slowly cooling the BGG glass after annealing to a temperature below the glass transition temperature to form the BGG glass material, wherein said BGG glass material has a transmission level of at least 80% over the wavelength range from about 0.5 micrometers to about 5 micrometers.

2. The process of claim 1 including the step of fining the BGG glass melt at about the glass melting temperature.

3. The process of claim 2 wherein the halogen component is selected from the group consisting of halogen gases, halide compounds and mixtures thereof.

4. The process of claim 3 wherein the melting temperature is about 1300° C. the liquidus temperature is about 1150° C., the crystallization temperature is about 800° C., and the glass transition temperature is about 675° C.

5. The process of claim 4 wherein the step of fining is conducted for a period of about one hour to remove bubbles from the glass melt and the glass melt is rapidly cooled from about the melting temperature to about the room temperature at which the BGG glass melt is in solid state and then heating the BGG glass from about room temperature to about 700° C. for annealing for a period of several hours to remove at least some of the stresses caused by the rapid cooling step.

6. The process of claim 5 wherein the rapid cooling step is conducted at a rate on the order of about 50° C. per minute and wherein the slow cooling step is conducted at a rate on the order of about 1° C. per minute.

7. The process of claim 3 including the step of adding rubidium oxide ($Rb_2O$) and/or cesium oxide ($Cs_2O$) to the BGG glass components in order to introduce rubidium ions and/or cesium ions into the BGG glass material.

8. The process of claim 7 including the step of ion exchanging cesium ions for rubidium ions.

9. The process of claim 7 wherein amount of germanium oxide is 40-60 mole %, amount of gallium oxide is 10-18 mole %, amount of barium oxide and/or barium carbonate is 20-45%, amount of cesium oxide is 0-40 mole %, amount of rubidium oxide is 0-40 mole %, and amount of the halogen component is 1-10 mole %.

10. The process of claim 9 wherein the halogen component is selected from the group consisting of barium chloride, rubidium chloride, cesium chloride and mixtures thereof.

11. The process of claim 3 including the step of adding seed material during the melting step to form crystals within the BGG glass material, nucleating the seed material at a nucleating temperature which is below the melting temperature and growing the crystals at a temperature above the nucleating temperature before the slow cooling step.

12. The process of claim 11 including the step of mixing the BGG glass components below the melting temperature.

13. The process of claim 12 wherein duration of said nucleating and crystal growth steps is about one hour.

14. The process of claim 11 wherein duration of said nucleating and said crystal growth steps is about one hour.

15. The process of claim 11 including the steps of cooling at a rate on the order of about 5° C. per minute after said crystal growth step down to near the glass transition temperature, holding at about the glass transition temperature to equalize inside and outside temperature, then cooling at a rate on the order of about 1° C. per minute.

16. The process of claim 2 wherein the halogen component is selected from the group consisting of barium chloride ($BaCl_2$), rubidium chloride (RbCl), cesium chloride (CsCl), and mixtures thereof.

17. The process of claim 2 wherein amount of germanium oxide is 35-90 mole %, amount of gallium oxide is 0.1-25 mole %, amount of barium oxide and/or barium carbonate is 0.1-50 mole %, and amount of the halogen component is 0.1-20 mole %, and wherein the BGG glass components include 0-50 mole % cesium oxide and 0-50 mole % rubidium oxide.

18. The process of claim 1 wherein said dry gas is $Ar/O_2$.

19. A BGG glass material having less than 1 part per million hydroxyl ions consisting essentially of:
    germanium oxide ($GeO_2$) having a concentration of about 35 mole percent to about 90 mole percent;
    gallium oxide ($Ga_2O_3$) having a concentration of about 0.1 mole percent to about 25 mole percent;
    barium oxide (BaO) and/or barium carbonate ($BaCO_3$) having a concentration of about 0.1 mole percent to about 50 mole percent;
    cesium oxide ($Cs_2O$) having a concentration of about 0 mole percent to about 50 mole percent;
    rubidium oxide ($Rb_2O$) having a concentration of about 0 mole percent to about 50 mole percent; and a halogen component having a concentration of about 0.1 mole percent to about 20 mole percent, wherein said BGG glass material has a transmission level of at least 80% over the wavelength range from about 0.5 micrometers to about 5 micrometers.

20. The BGG glass material of claim 19 wherein said halogen component is selected from the group consisting of barium chloride, rubidium chloride, cesium chloride and mixtures thereof.

21. A BGG glass material consisting essentially of
germanium oxide ($GeO_2$) having a concentration of about 40 mole percent to about 60 mole percent;
gallium oxide ($Ga_2O_3$) having a concentration of about 10 mole percent to about 18 mole percent;
barium oxide (BaO) and/or barium carbonate ($BaCO_3$) having a concentration of about 20 mole percent to about 45 mole percent;
cesium oxide ($Cs_2O$) having a concentration of about 0 mole percent to about 40 mole percent;
rubidium oxide ($Rb_2O$) having a concentration of about 0 mole percent to about 40 mole percent; and
a halogen component having a concentration of about 1 mole percent to about 10 mole percent, wherein said BGG lass material has a transmission level of at least 80% over the wavelength range from about 0.5 micrometers to about 5 micrometers.

22. The BGG glass material of claim 21 wherein said halogen component is selected from the group consisting of barium chloride, rubidium chloride, cesium chloride and mixtures thereof.

23. An article of manufacture comprising a BGG glass material consisting essentially of germanium oxide ($GeO_2$) having a concentration of about 40 mole percent to about 60 mole percent:
gallium oxide ($Ga_2O_3$) having a concentration of about 10 mole percent to about 18 mole percent;
barium oxide (BaO) and/or barium carbonate ($BaCO_3$) having a concentration of about 20 mole percent to about 45 mole percent;
cesium oxide ($Cs_2O$) having a concentration of about 0 mole percent to about 40 mole percent;
rubidium oxide ($Rb_2O$) having a concentration of about 0 mole percent to about 40 mole percent; and
a halogen component having a concentration of about 1 mole percent to about 10 mole percent, wherein said BGG glass material has a transmission level of at least 80% over the wavelength range from about 0.5 micrometers to about 5 micrometers.

24. The article of manufacture of claim 23, wherein said article is a window.

25. The article of manufacture of claim 23, wherein said article is a dome.

* * * * *